(12) United States Patent
Sakamoto

(10) Patent No.: US 7,702,323 B2
(45) Date of Patent: Apr. 20, 2010

(54) WIRELESS CONTROL SYSTEM, CONTROL DEVICE, CONTROLLABLE DEVICE DEVICE CONTROL METHOD, CONTROL PROGRAM, AND COMPUTER READABLE RECORDING MEDIUM CONTAINING THE SAME

(75) Inventor: Kenji Sakamoto, Chiba (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 485 days.

(21) Appl. No.: 10/553,345

(22) PCT Filed: Apr. 15, 2004

(86) PCT No.: PCT/JP2004/005435

§ 371 (c)(1),
(2), (4) Date: Oct. 14, 2005

(87) PCT Pub. No.: WO2004/093485

PCT Pub. Date: Oct. 28, 2004

(65) Prior Publication Data

US 2006/0234659 A1  Oct. 19, 2006

(30) Foreign Application Priority Data

Apr. 17, 2003 (JP) .............................. 2003-112994
Apr. 12, 2004 (JP) .............................. 2004-117292

(51) Int. Cl.
*H04M 3/00* (2006.01)

(52) U.S. Cl. .................... 455/420; 455/419; 455/550.1; 455/556.1; 455/411; 455/410

(58) Field of Classification Search ................. 455/420, 455/419, 550.1, 556.1, 411, 410, 422.1; 725/81
See application file for complete search history.

(56) References Cited

U.S. PATENT DOCUMENTS 5,802,467 A * 9/1998 Salazar et al. ................ 455/420
5,901,366 A * 5/1999 Nakano et al. ............ 455/550.1

(Continued)

FOREIGN PATENT DOCUMENTS

| JP | 2000-78066 A | 3/2000 |
| JP | 2000-251456 A | 9/2000 |
| JP | 2001-103336 A | 4/2001 |

(Continued)

*Primary Examiner*—Joseph H Feild
*Assistant Examiner*—Huy D Nguyen
(74) *Attorney, Agent, or Firm*—Birch, Stewart, Kolasch & Birch, LLP

(57) ABSTRACT

The wireless control system of the present invention constitutes a wireless AV system (101) which forms a wireless transmission network (1) in which a wireless center unit (102) and a TV main body unit (103) are connected with each other by a wireless LAN. The wireless center unit (102) transmits to the TV main body unit (103) control data having, in a control command, a discrimination code for discriminating between devices in the wireless AV system (101). The TV main body unit (103) reads out the discrimination code included in the received control data, discriminates a device to carry out the control command included in the control data, and transmits the control data to the discriminated device. As a result, even when the number of controlled devices that a controlling device has to control increases, a throughput of the controlling device for discrimination of control data does not increase, and therefore the whole system constituted of the controlling device and the controlled devices can be smoothly operated.

19 Claims, 12 Drawing Sheets

U.S. PATENT DOCUMENTS

| | | | |
|---|---|---|---|
| 6,075,330 A * | 6/2000 | Terk ........................ 455/151.1 |
| 6,542,735 B1 * | 4/2003 | Carley ........................ 455/420 |
| 6,771,955 B2 * | 8/2004 | Imura et al. ................. 455/420 |
| 7,010,294 B1 * | 3/2006 | Pyotsia et al. ............... 455/420 |
| 7,035,586 B2 * | 4/2006 | Finet ............................ 455/7 |
| 7,127,270 B2 * | 10/2006 | Sinclair .................... 455/556.1 |
| 7,228,122 B2 * | 6/2007 | Oyagi et al. ................. 455/411 |
| 2002/0085570 A1 | 7/2002 | Yoshida et al. |
| 2002/0098834 A1 * | 7/2002 | Yuen ........................ 455/420 |
| 2002/0098835 A1 * | 7/2002 | Flick ........................ 455/420 |
| 2002/0109270 A1 | 8/2002 | Swaab |
| 2003/0236088 A1 * | 12/2003 | Im ........................... 455/420 |
| 2004/0193647 A1 | 9/2004 | Ueda et al. |

FOREIGN PATENT DOCUMENTS

| | | |
|---|---|---|
| JP | 2002-232978 A | 8/2002 |
| JP | 2003-9261 A | 1/2003 |
| WO | WO-01/06795 A1 | 1/2001 |
| WO | WO-01/10098 A1 | 2/2001 |
| WO | WO-02/098060 A1 | 12/2002 |
| WO | WO-03/007594 A1 | 1/2003 |

* cited by examiner

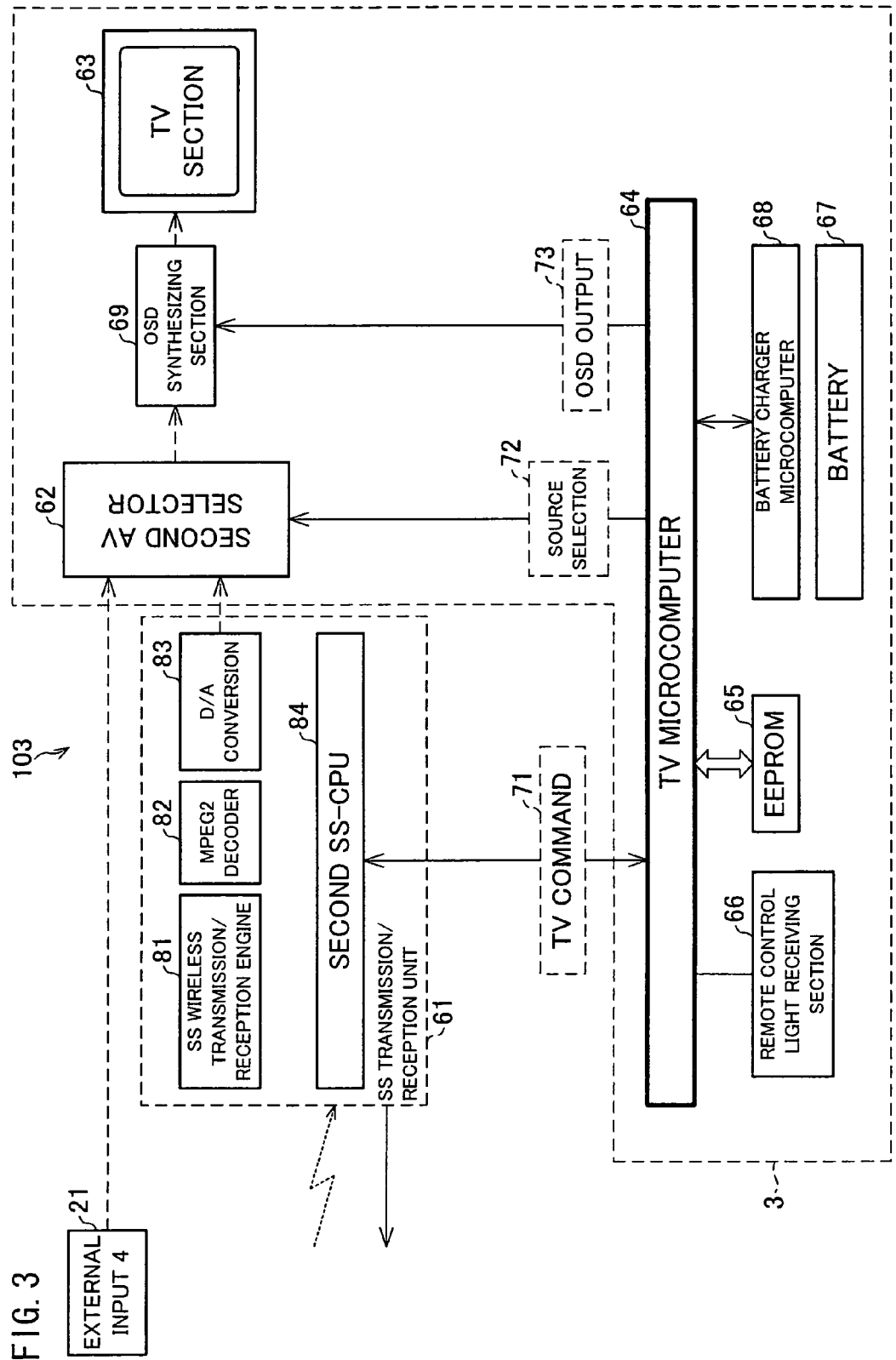

```
┌─── CONVERSION RULE ───────────┐
│                               │
│  KEY CODE : 0xFF              │
│                               │
│  DATA:                        │
│                               │
│    0x00 ~ 0xFD → NOT CONVERTED│
│                               │
│    0xFE → 0xFE 0x00           │
│                               │
│    0xFF → 0xFE 0x01           │
│                               │
└───────────────────────────────┘
```

EXAMPLE OF FORMAT OF CONTROL DATA

- CHECKSUM (1byte)
- MAIN BODY OF DATA (ARBITRARY)
- DATA SIZE (2byte)
- COMMAND DISCRIMINATION ID (1byte)

FIG. 7(a)
CONTROL COMMAND FOR WIRELESS STATION 1 (COMMAND DISCRIMINATION ID=1)
 【BEFORE CONVERSION】
  0x01  0x05  0x01  <u>0xFE</u>  0x02  <u>0xFF</u>  0xA0  0x01
 【AFTER CONVERSION】
  <u>0xFF</u>  0x01  0x05  0x01  <u>0xFE  0x00</u>  0x02  <u>0xFE  0x01</u>  0xA0  0x01

FIG. 7(b)
CONTROL COMMAND FOR WIRELESS STATION 2 (COMMAND DISCRIMINATION ID=2)
 【BEFORE CONVERSION】
  0x02  0x05  0x01  <u>0xFE</u>  0x02  <u>0xFF</u>  0xA0  0x02
 【AFTER CONVERSION】
  <u>0xFF</u>  0x02  0x05  0x01  <u>0xFE  0x00</u>  0x02  <u>0xFE  0x01</u>  0xA0  0x02

FIG. 7(c)
CONTROL COMMAND FOR CONTROLLED DEVICE (COMMAND DISCRIMINATION ID=3)
 【BEFORE CONVERSION】
  0x03  0x05  0x01  <u>0xFE</u>  0x02  <u>0xFF</u>  0xA0  0x03
 【AFTER CONVERSION】
  <u>0xFF</u>  0x03  0x05  0x01  <u>0xFE  0x00</u>  0x02  <u>0xFE  0x01</u>  0xA0  0x03

FIG. 7(d)
CONTROL COMMAND FOR EXTERNAL DEVICE (COMMAND DISCRIMINATION ID=4)
 【BEFORE CONVERSION】
  0x04  0x05  0x01  <u>0xFE</u>  0x02  <u>0xFF</u>  0xA0  0x04
 【AFTER CONVERSION】
  <u>0xFF</u>  0x04  0x05  0x01  <u>0xFE  0x00</u>  0x02  <u>0xFE  0x01</u>  0xA0  0x04

STRUCTURE OF
TRANSMISSION PACKET

STRUCTURE OF
TRANSMISSION PACKET

STRUCTURE OF
TRANSMISSION PACKET

— CRC
— PARAMETER (=1: EXTERNAL INPUT)
— COMMAND NO.(=1: INPUT SWITCHING)
— SIZE (=2)
— COMMAND DISCRIMINATION ID (=3)

STRUCTURE OF
TRANSMISSION PACKET

WIRELESS CONTROL SYSTEM, CONTROL DEVICE, CONTROLLABLE DEVICE DEVICE CONTROL METHOD, CONTROL PROGRAM, AND COMPUTER READABLE RECORDING MEDIUM CONTAINING THE SAME

TECHNICAL FIELD

The present invention relates to: a wireless control system constituted of a controlling device and controlled devices that are wirelessly controlled by the controlling device; a controlling device; controlled devices; method of controlling devices; a control program; and a storage medium readable by a computer, for storing the program.

BACKGROUND ART

Recently, with the explosive prevalence of the Internet, a LAN (Local Area Network) is frequently constructed in offices, houses and the like.

Because cable wiring is troublesome, there is an increasing need for so called wireless LANs which construct a LAN wirelessly, which is aided by progress in digital wireless communication technologies. Further, wireless communication devices which constitute such a wireless LAN are expected to be used in large numbers, because the devices can be used in mobile terminals, such as notebook computers in mobile environments.

As a representative technology of the wireless LAN, there is IEEE 802.11 which has already been standardized by IEEE (Institute of Electrical and Electronics Engineers). This standardized technology defines from a physical layer to a MAC (Media Access Control) layer, being a lower layer of a data link in an OSI model, and can be replaced with Ethernet™ which is a wired LAN transmission channel. Further, IEEE 802.11 can provide a roaming function as an additional function due to being wireless.

Recently, in order to transmit/receive video image data or audio data wirelessly, a wireless AV system using such a wireless LAN is proposed.

Generally, a wireless AV system has a problem that video image data to be transmitted/received deteriorates due to transmission errors.

Patent Document 1 (PCT international publication No. WO 01/006795 (publication date; Jan. 25, 2001)) discloses an image decoding method in which a transmission error is detected by an image header included in video image data, and when a transmission error is detected, video image data is temporarily stored, repetition of a header different from the image header is detected, and based on this repeated header, temporarily stored video image data is decoded, and thereby deterioration of the video image data is prevented.

In a conventional wireless AV system, when one controlling device (such as an AV amplifier) controls a plurality of controlled devices (such as a video deck, a DVD player, a stereo, and a TV), the controlling device transmits control data by wireless to each of the controlled devices. Namely, the controlling device causes a data transmitting/receiving unit thereof to sort and transmit control data to each of the controlled devices.

As a result, the more controlled devices one controlling device has to control, the larger throughput is necessary for sorting of control data items in a data transmitting/receiving unit included in the controlling device, that is, the larger throughput is necessary for discriminating control data items, which makes it difficult for the controlling device to promptly control the controlled devices, with a result that the whole of the wireless AV system does not operate smoothly.

The present invention is made in view of the foregoing problems, and its object is to realize a wireless control system in which, even when the number of controlled devices which the controlling device has to control increases, a throughput for discriminating control data in the controlling side does not increase, and the whole of the wireless AV system can be smoothly operated.

DISCLOSURE OF INVENTION

In order to solve the foregoing problem, the wireless control system of the present invention is constituted of a controlling device and controlled devices that are wirelessly controlled by the controlling device, wherein the controlling device wirelessly transmits control data to the controlled devices, the control data having, in a control command for controlling the controlled devices, a discrimination code for discriminating between a controlled device to which the control command is to be transmitted and other one or more controlled devices in the system, the controlled devices receive the control data transmitted wirelessly from the controlling device, read out the discrimination code included in the received control data, discriminate a controlled device to carry out the control command included in the control data, and transmit the control data to the discriminated controlled device.

Further, the wireless control system is constituted of a controlling device and controlled devices that are wirelessly controlled by the controlling device, wherein the controlling device includes (i) a control data generating section for generating control data having, in a control command for controlling the controlled devices, a discrimination code for discriminating between a controlled device to which the control command is to be transmitted and other one or more controlled devices in the system, and (ii) a wireless communication section for transmitting the control data transmitted from the control data generating section, to a controlled device with which the wireless communication section is in communication, and the controlled devices include (i) a wireless communication section for receiving the control data from the controlling device, (ii) a discrimination section for reading out the discrimination code included in the received control data and discriminating a controlled device to carry out the control command included in the control data, and (iii) a control data transmission section for transmitting the control data to the controlled device discriminated by the discrimination section.

With these arrangements, the controlling device generates control data having, in a control command, a discrimination code for discriminating between the controlled devices, and the controlled devices use the control data so as to perform discrimination of control data. As a result, even when the number of controlled devices to be controlled by one controlling device increases, a throughput for discriminating control data in the controlling device does not increase.

Therefore, even when the number of the controlled devices increases, the burden of data processing in the controlling device does not increase, so that the controlling device can promptly control each of the controlled devices. As a result, the whole of the wireless AV system can be operated smoothly.

The control data generating section may be arranged so that when generated control data includes the same data as a predetermined key code, the control data generating section performs a predetermined conversion of the same data, and transmits the converted control data to the wireless communication section.

In this case, misidentification of a discrimination code can be avoided, so that the controlling device can always control a suitable controlled device.

Control data generated in the control data generating section may be any one of control data to be transmitted to a control section included in the controlling device, control data to be transmitted to the wireless communication section in the controlling device, control data to be transmitted to a control section included in the controlled devices, and control data to be transmitted to the wireless communication section in the controlled devices.

Further, the control data may include, as a control command, a command for performing a change of a data transmission rate, a change of a wireless communication channel, a change of a tuner channel, switching of an input, and acquisition of a communication state.

Further, the controlled devices of the wireless control system may be arranged as follows.

The controlled devices according to the present invention may be arranged so as to be included in a wireless control system constituted of a controlling device and controlled devices that are wirelessly controlled by the controlling device, the controlled devices (i) receiving control data which includes a discrimination code for discriminating between the controlled devices in the system, and (ii) discriminating a controlled device to carry out a control command included in the control data, based on the discrimination code included in the received control data.

Further, the controlled devices according to the present invention may be arranged so as to be included in a wireless control system constituted of a controlling device and controlled devices that are wirelessly controlled by the controlling device, the controlled devices including (i) a wireless communication section for receiving from the controlling device control data including a discrimination code for discriminating between the controlled devices in the system, (ii) a discrimination section for reading out a discrimination code included in the received control data and discriminating a controlled device to carry out a control command included in the control data, and (iii) a control data transmission section for transmitting the control data to the controlled device discriminated by the discrimination section.

Further, the controlling device of the wireless control system may be arranged as follows.

The controlling device according to the present invention may be arranged so as to be included in a wireless control system constituted of a controlling device and controlled devices that are wirelessly controlled by the controlling device, the controlling device wirelessly transmitting control data to the controlled devices, the control data having, in a control command for controlling the controlled devices, a discrimination code for discriminating between a controlled device to which the control command is to be transmitted and other one or more controlled devices in the system.

Further, the controlling device according to the present invention may be arranged so as to be included in a wireless control system constituted of a controlling device and controlled devices that are wirelessly controlled by the controlling device, the controlling device including (i) a control data generating section for generating control data having, in a control command for controlling the controlled devices, a discrimination code for discriminating between a controlled device to which the control command is to be transmitted and other one or more controlled devices in the system, and (ii) a wireless communication section for transmitting the control data transmitted from the control data generating section, to a controlled device with which the wireless communication section is in communication.

As the wireless communication section, a communication section that transmits control data using a spread spectrum wireless system is preferably used.

Further, as the wireless communication section, a communication section that performs low power, close range, two-way wireless communication such as a wireless LAN, Bluetooth or UWB (Ultra Wide Band) is preferably used.

Note that the wireless control system may be realized by a computer. In this case, a storage medium readable by a computer, for storing a control program which realizes the wireless control system using a computer by causing the computer to function as each of the sections, is also within the scope of the present invention.

For a fuller understanding of the nature and advantages of the invention, reference should be made to the ensuing detailed description taken in conjunction with the accompanying drawings.

BRIEF DESCRIPTION OF DRAWINGS

FIG. 3 is a block diagram illustrating a main structure of a TV main body unit constituting the wireless AV system illustrated in FIG. 1.

FIG. 4($b$) is a schematic diagram illustrating another example of transmission/reception of a control command between the wireless center unit and the TV main body unit.

FIG. 4($c$) is a schematic diagram illustrating a further example of transmission/reception of a control command between the wireless center unit and the TV main body unit.

FIG. 7($a$) is a figure illustrating one example of conversion of control data, according to the conversion method and the data structure of control data.

FIG. 7($b$) is a figure illustrating another example of conversion of control data, according to the conversion method and the data structure of control data.

FIG. 7($c$) is a figure illustrating a further example of conversion of control data, according to the conversion method and the data structure of control data.

FIG. 7($d$) is a figure illustrating a further example of conversion of control data, according to the conversion method and the data structure of control data.

FIG. 8($b$) is a figure illustrating a data structure of control data in the transmission/reception of control data illustrated in FIG. 8($a$).

BEST MODE FOR CARRYING OUT THE INVENTION

One embodiment of the present invention is described below with reference to the attached drawings. In the present embodiment, an example in which the wireless controlling system of the present invention is applied to a wireless AV (audio visual) system is described.

Figure 1:
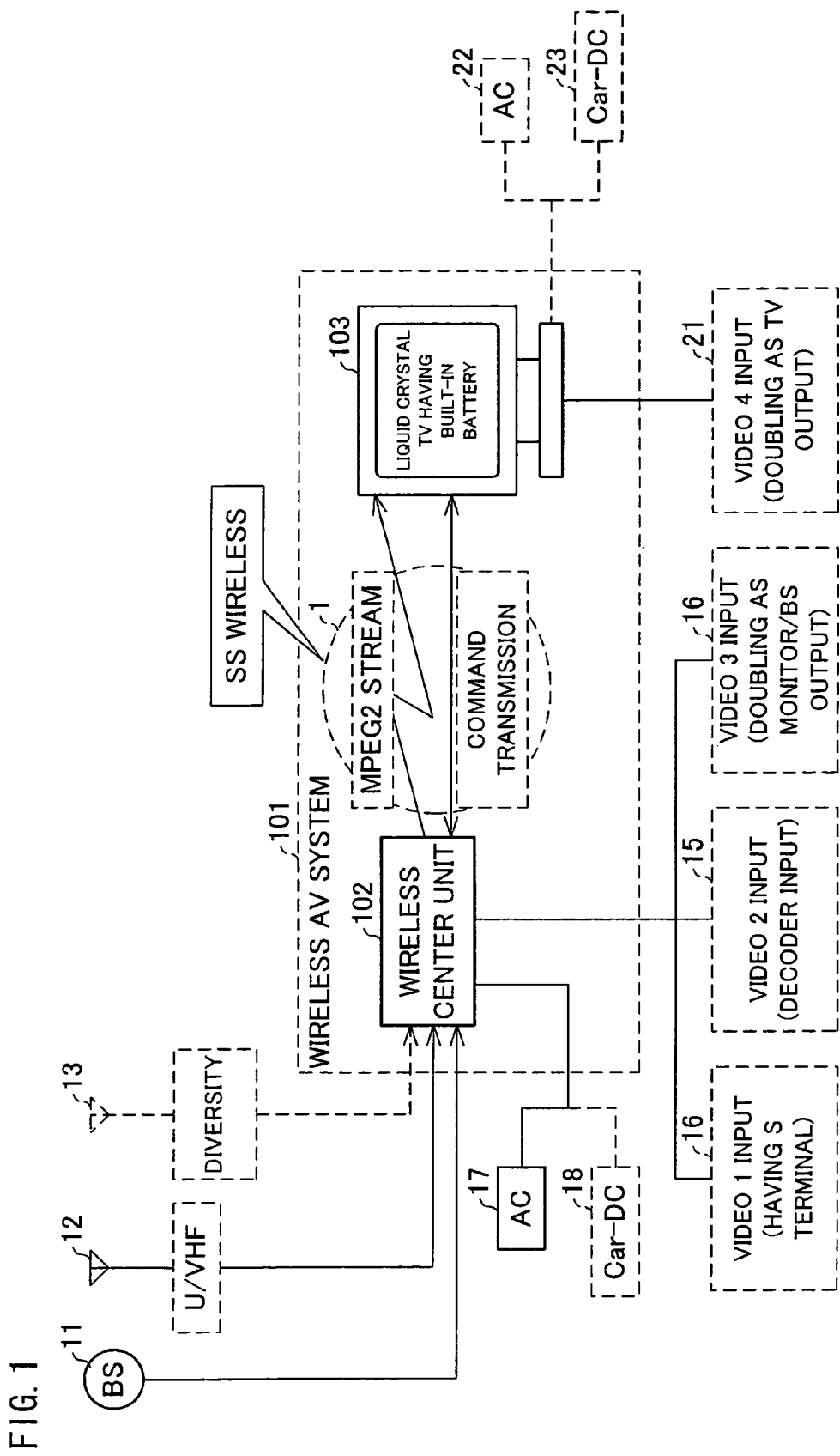
FIG. 1 is a block diagram illustrating a main structure of a wireless AV system according to an embodiment of the present invention.

FIG. 1 is a block diagram illustrating a main structure of a wireless AV system 101 according to the present embodiment. Here, an example is illustrated in which the wireless AV system 101 is applied to a wireless TV receiving device having a separable display, as illustrated in FIG. 12.

Figure 12:
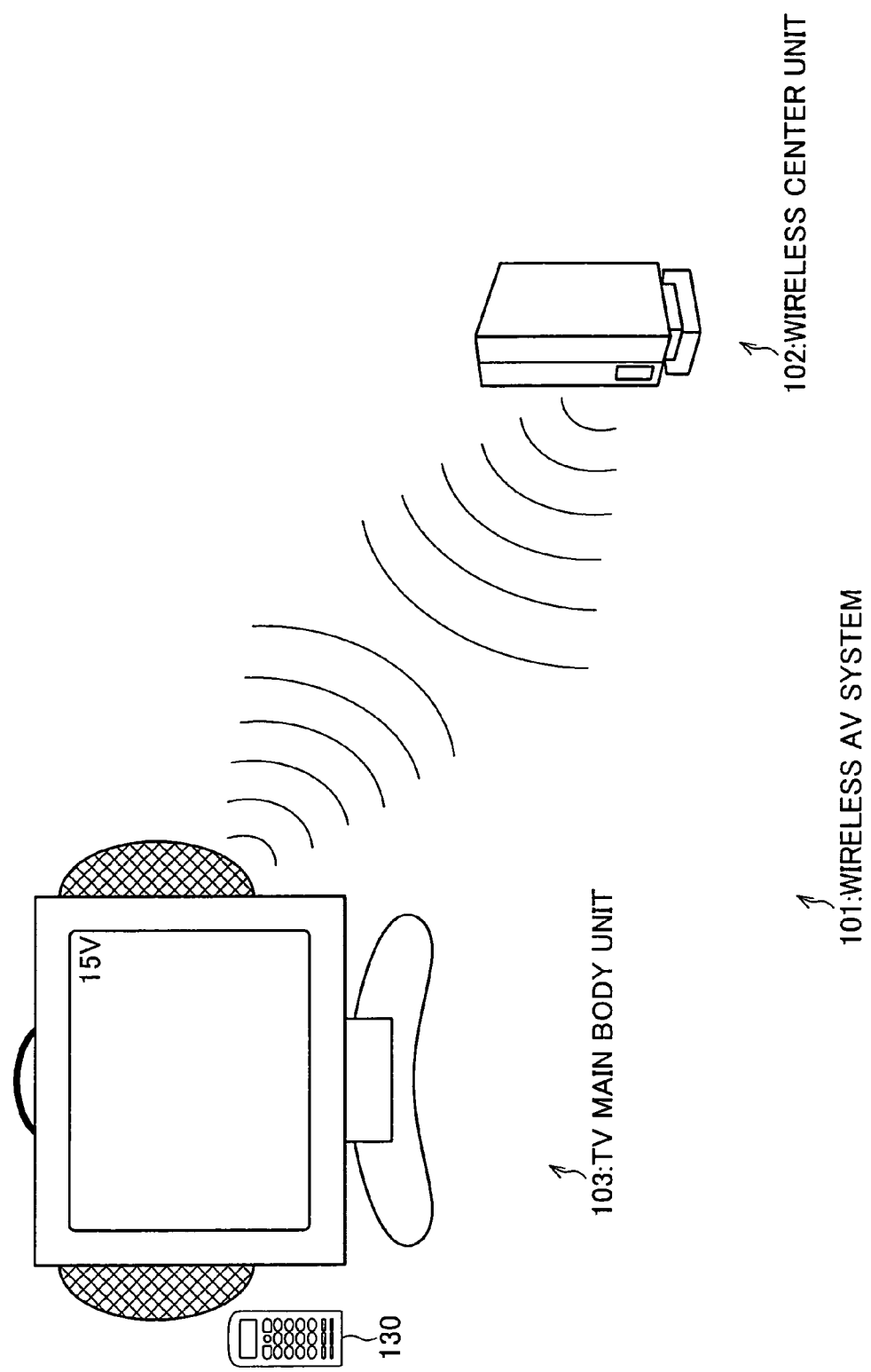
FIG. 12 is a figure illustrating a concrete example of the wireless AV system of the present invention.

That is, as illustrated in FIG. 12, the wireless AV system 101 is constituted of a TV main body unit 103 and a wireless center unit 102.

The TV main body unit 103 has a wireless TV receiving device including a battery, and a remote controller 130. The remote controller 130 allows remote control of a video deck or the like connected to the wireless center unit 102 via the TV main body unit 103.

Further, the wireless center unit 102 is connected with antennas for BS, U/VHF and the like, and AV devices such as a DVD player and a video deck, and image and/or audio data is wirelessly transmitted to the TV main body unit 103.

The wireless AV system 101 is fully explained below. In the following explanation, "data" means all data items transmitted/received in a general wireless AV system 101, such as control data, image data, or audio data.

As illustrated in FIG. 1, the wireless AV system 101 is constituted of the wireless center unit 102 as a base device and the TV main body unit 103 as a portable terminal. A pair of the wireless center unit 102 and the TV main body unit 103 constitutes a wireless transmission network 1.

The wireless center unit 102 and the TV main body unit 103 have functions of both a controlling device and a controlled device. That is, when the wireless center unit 102 functions as a controlling device, the TV main body unit 103 functions as a controlled device, and when the TV main body unit 103 functions as a controlling device, the wireless center unit 102 functions as a controlled device.

Here, in the wireless transmission network 1, data is transmitted/received between the wireless center unit 102 and the TV main body unit 103 through a SS (Spread Spectrum) wireless system based on the IEEE 802.11 standard.

The wireless center unit 102 includes antenna terminals (a BS (broadcasting satellite) terminal 11, a U/VHF antenna terminal 12, and a diversity terminal 13), a video 1 input terminal having an S terminal (external input 1) 14 for connecting a device such as a digital VTR or DVD player, a video 2 input terminal (external input 2) 15 for a decoder input and a video 3 input terminal (external input 3) 16 which doubles as a monitor/BS output, and, provided as power sources, an AC power source section 17 and Car-DC power source section 18.

Note that the wireless center unit 102 is fully explained later.

The TV main body unit 103 includes a video 4 input terminal (external input 4) 21, which doubles as a TV output, for connecting a device such as a digital VTR or DVD (Digital Versatile Disc) player, and a power source terminal (not shown) to be connected with an AC power source section 22 and Car-DC power source section 23 which are provided as power sources.

The TV main body unit 103 is a thin display device that is detachable from the wireless center unit 102 and is mobile or portable because of a built-in battery. The TV main body unit 103 is a broad concept including a variety of display devices such as a liquid crystal TV, an inorganic EL (Electroluminescence)/organic EL display, or a plasma display, and is not limited by its display mechanism.

Note that the TV main body unit 103 is fully explained later.

Figure 13:
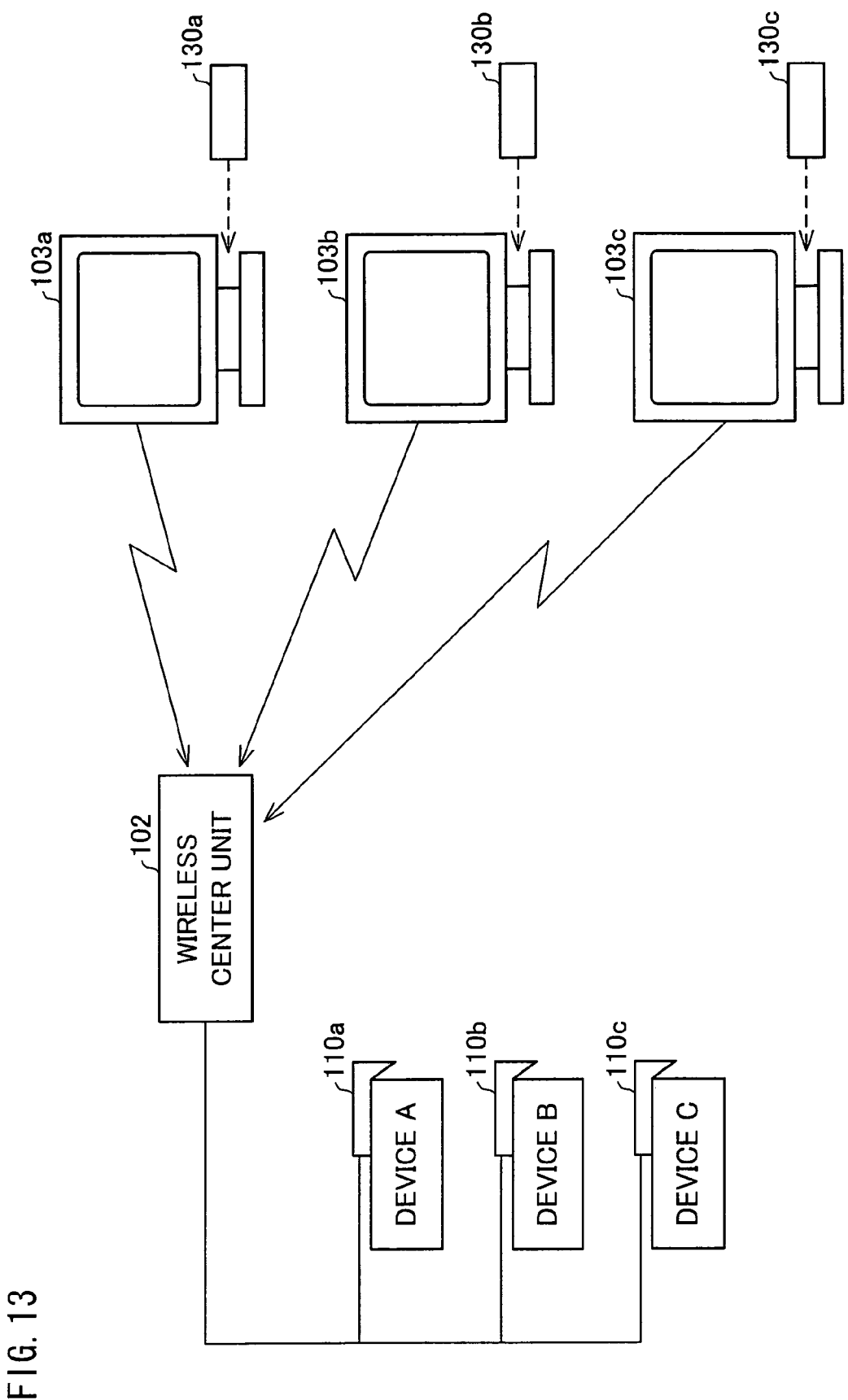
FIG. 13 is a figure illustrating an applied example of the wireless AV system illustrated in FIG. 12.

In the present embodiment, the TV main body unit 103 mainly includes a display function, an audio function and the like, and on the other hand the wireless center unit 102 mainly includes a controlling function and the like for controlling a tuner section and the TV main body unit 103. Note that in the present embodiment, the TV main body unit 103 is explained using a liquid crystal TV as an example of a thin display device. For example, a system illustrated in FIG. 13 is conceivable. FIG. 13 is explained later.

As described above, in the wireless transmission network 1 formed between the wireless center unit 102 and the TV main body unit 103, data is transmitted/received by a SS wireless method. Here, as a frequency band, the 2.4 GHz band is used. Note that recently the 5 GHz band is available as a frequency band, and the 5 GHz band may be used instead of the 2.4 GHz band.

Moving image data, DVD-Video data, or digital broadcasting data is transmitted from the wireless center unit 102 to the TV main body unit 103, using an MPEG (Moving Picture Expert Group) 2 image compression format, through a communication line whose capacity is more than 10 Mbps. Further, command (controlling signal) transmission between the wireless center unit 102 and the TV main body unit 103 is performed using the SS wireless method.

Here, MPEG is explained.

When coded streams (bit rows) of MPEG video and MPEG audio, including other coded streams, are applied to a practical application, it is necessary to multiplex, synthesize, and combine the coded streams, including synchronization of the coded streams, and at the same time it is necessary to cause the streams to have a data form suitable for a format or protocol inherent in storage media or a network.

There are two kinds of MPEG2 system: one is a program stream (MPEG2-PS), which constitutes a program as with MPEG1, and the other is a transport stream (MPEG2-TS) which can constitute a plurality of programs.

An MPEG stream is a byte stream in which units such as flags (there are many 1 bit flags) and headers are ordered by 1 byte. All MPEG systems have a common data structure in which information indicative of length is disposed ahead of a data portion whose length is not fixed, and when the data portion is unnecessary, the data portion is skipped or a beginning of the next data group is located, and thereby reliable separated processing can be performed.

In order to prevent an over flow or under flow of image data and audio data on a decoding-side, it is necessary for a device which receives a compressed image and audio signal, based on an MPEG coding method, to synchronize image and audio sampling frequencies on a coding-side with image and audio sampling frequencies or STC (System Time Clock) on the decoding-side.

For that reason, a decoding device synchronizes the image and audio sampling frequencies on the coding-side with the image and audio sampling frequencies on the decoding-side by using PCR (Program Clock Reference) or SCR (System Clock Reference) which are defined by MPEG2 system standard (ISO/IEC standard 13818-1).

Here, the wireless center unit 102 and the TV main body unit 103 of the wireless AV system 101 having the above structure are fully explained below with reference to FIGS. 2 and 3.

Figure 2:
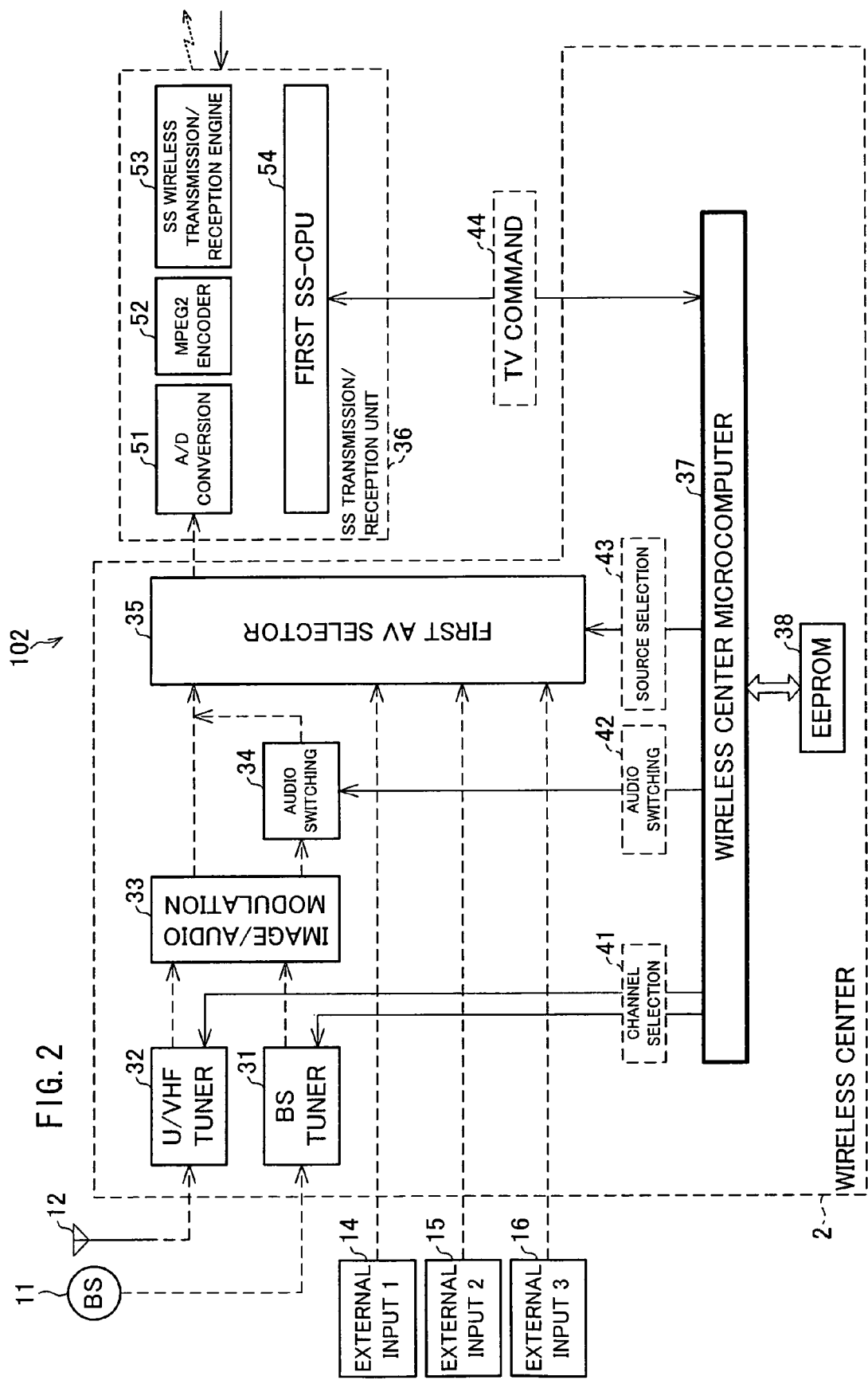
FIG. 2 is a block diagram illustrating a main structure of a wireless center unit constituting the wireless AV system illustrated in FIG. 1.

FIG. 2 is a block diagram illustrating an outline of the wireless center unit 102 and FIG. 3 is a block diagram illustrating an outline of the TV main body unit 103.

As illustrated in FIG. 2, the wireless center unit 102 is constituted of a wireless center 2, and an SS transmission/reception unit 36 provided as communication means (communication section) for transmitting data from the wireless center 2 to the TV main body unit 103 (see FIG. 1) using the SS wireless method, and receiving a command (control command) from the TV main body unit 103.

The wireless center 2 includes: a BS tuner 31, connected with the BS terminal 11, for receiving and selecting BS broadcasting by a channel selection signal; a U/VHF tuner 32, connected with the U/VHF antenna terminal 12, for receiving and selecting U/VHF broadcasting by a channel selection signal; an image/audio demodulating section 33 for demodulating an image/audio (AV) signal received and selected by the BS tuner 31 or the U/VHF tuner 32; an audio switching section 34 for switching, according to an audio switching signal, between a received audio and information concerning TV programs such as EPG (Electrical Program Guide); a first AV selector 35 for selecting, using a source selection signal, (i) image/audio information received (ii) information concerning programs, and (iii) external input information from the video 1 input terminal 14, the video 2 input terminal (decoder input) 15, and the video 3 input terminal (which doubles as monitor/BS output) 16; a wireless center microcomputer 37 for controlling each of the sections; an EEPROM (electrically erasable programmable ROM) 38 which is an electrically rewritable non-volatile memory for storing a variety of data items such as a controlling program of the wireless center microcomputer 37, communication control data, and a communication channel changing program.

The wireless center microcomputer 37 transmits a channel selection signal 41 to the BS tuner 31 and the U/VHF tuner 32, transmits an audio switching signal 42 to the audio switching section 34, transmits a source selection signal 43 to the first AV selector 35, and transmits and receives a TV command 44 to and from the SS transmission/reception unit 36.

Further, the wireless center microcomputer 37 also serves as: a control data generating section for generating later-mentioned control data; a discriminating section for discriminating a device to be controlled according to a discrimination code included in the control data; and a control data transmission section for transmitting the control data to the discriminated controlled device.

The channel selection signal 41 includes information for specifying a channel of a TV program. Further, the audio switching signal 42 includes information for switching audios such as main audio, sub audio, stereo, monaural and the like. Further, the source selection signal 43 includes information for selecting from an audio/image signal from an external device such as the video 1 input terminal 14 through the video 3 input terminal 16, and an audio/image signal received by the BS tuner 31 and the U/VHF tuner 32.

That is, the BS tuner 31 and the U/VHF tuner 32 accept broadcast of a program channel specified by the channel selection signal 41 from the wireless center microcomputer 37.

Further, the audio switching section 34 switches audios outputted from the image/audio demodulating section 33 to audios specified by the audio switching signal 42 from the wireless center microcomputer 37.

Further, the first AV selector 35 selects a source (an image/audio signal from an external device, such as via the video 1 input terminal 14, and an image/audio signal from the BS tuner 31 or U/VHF tuner 32) specified by the source selection signal 43 from the wireless center microcomputer 37.

Further, the TV command 44 is a control signal transmitted/received between the wireless center microcomputer 37 and the SS transmission/reception unit 36, for controlling the whole of the device.

That is, the TV command 44 is generated in the wireless center microcomputer 37 and transmitted to the SS transmission/reception unit 36, and further is transmitted to the TV main body unit 103 which is a device with which the SS transmission/reception unit 36 communicates. On the other hand, in the wireless center unit 102, the wireless center microcomputer 37 receives a TV command 71 (see FIG. 3) from the TV main body unit 103 which communicates via the SS transmission/reception unit 36.

As a result, in the TV main body unit 103, by receiving the TV command 44 from the wireless center unit 102 with which the TV main body unit 103 is in communication, each section of the TV main body unit 103 is controlled, and in the wireless center unit 102, by receiving the TV command 71 (see FIG. 3) from the TV main body unit 103 with which the wireless center unit 102 is in communication, each section of the wireless center unit 102 is controlled.

Note that in the present embodiment, the wireless center 2 having the BS tuner 31 and the U/VHF tuner 32 as a broadcast tuner is exemplified. However, the wireless center 2 may be arranged so as to have a tuner for receiving analog broadcasting, or a tuner for receiving digital broadcasting. Further, the tuner for receiving digital broadcasting may be a tuner for satellite digital broadcasting, or a tuner for terrestrial digital broadcasting.

The SS transmission/reception unit 36 is constituted of: an A/D conversion section 51 for converting data selected by the first AV selector 35 in the wireless center 2 into a digital signal; an MPEG2 encoder 52 for converting data converted into a digital signal by the A/D conversion section 51 into an MPEG2 image compression format; an SS wireless transmission/reception engine 53 constituted of an SS wireless device and wireless controlling section for transmitting transmission data (such as MPEG2 streams or commands) by the SS wireless method; and a first SS-CPU 54 for controlling each section of the SS transmission unit and detecting a state of radio wave.

The SS wireless transmission/reception engine 53 has: a transmitting function for transmitting an MPEG2 stream such as image and/or audio data or a command such as control data to an SS transmission/reception unit 61 (mentioned later in relation to FIG. 3) of the TV main body unit 103; and a receiving function for receiving a command such as control data from the SS transmission/reception unit 61.

Note that in the present embodiment, a program for controlling the wireless center unit 102 is stored in the EEPROM 38 so as to be rewritable. Therefore, by rewriting the program, control contents can be easily changed. The reason for storing the program for controlling the wireless center unit 102 in a rewritable memory is to avoid wasting a time for changing a mask ROM with respect to each debug in system development. Namely, by using a non-volatile memory (e.g. EPROM or EEPROM) as a program ROM, a time for developing or modifying a program is greatly reduced. Further, by downloading a program so as to rewrite program contents of the EEPROM 38, it becomes easy to upgrade or change the function.

Next, the TV main body unit 103 is fully explained below with reference to FIG. 3.

As illustrated in FIG. 3, the TV main body unit 103 is constituted of a TV main body 3, and an SS transmission/reception unit 61, which acts as communication means for transmitting a command from the TV main body 3 to the wireless center unit 102 (see FIG. 1) using the SS wireless method, and for receiving data from the wireless center unit 102.

The SS transmission/reception unit 61 transmits/receives TV commands 71 and receives an MPEG stream or command transmission data transmitted from the SS transmission/reception unit 36 of the wireless center unit 102, and decodes (restores) the received MPEG stream and the like into the original data. The SS transmission/reception unit 61 is fully explained later.

The TV main body 3 is constituted of: a second AV selector 62 for selecting between data restored by the SS transmission/reception unit 61 and an external AV signal inputted via the video 4 input terminal 21, which doubles as a TV output; a TV section 63 (a part of informing means) constituted of LCD or the like for displaying an image signal and outputting an audio signal; a TV microcomputer 64 (a part of informing means) for controlling the whole of the device, by transmitting/receiving TV commands 71 and transmitting a source selection signal 72, an OSD (On Screen Display) signal 73 and the like; an EEPROM 65 which is an electrically rewritable non-volatile memory for storing a variety of data items such as a controlling program of the TV microcomputer 64, communication control data, and a communication channel changing program; a remote control light receiving section 66 for receiving a control command in the form of light from a remote control device (not shown); a battery 67; a battery charger microcomputer 68 for controlling charging/discharging of the battery 67; and an OSD synthesizing section 69 for synthesizing an image signal outputted from the second AV selector 62 and the OSD signal 73 outputted from the TV microcomputer 64 so as to output the synthesized signal to the TV section 63.

The TV microcomputer 64 also serves as: a control data generating section for generating later-mentioned control data; a discrimination section for discriminating a controlled device according to a discrimination code included in the control data; and a control data transmission section for transmitting the control data to the discriminated controlled device.

The SS transmission/reception unit 61 is constituted of: an SS wireless transmission/reception engine 81 constituted of an SS wireless device and wireless control section for receiving data transmitted using the SS wireless method; an MPEG2 decoder 82 for decoding a received MPEG2 stream; a D/A conversion section 83 for converting decoded data into an analog signal; and a second SS-CPU 84 (communication state detection means) for controlling each section of the SS transmission/reception unit and detecting a state of an radio wave.

The SS wireless transmission/reception engine 81 has: a receiving function for receiving an MPEG2 stream, a command or the like from the SS transmission/reception unit 36 of the wireless center unit 102; and a transmitting function for transmitting a command or the like from the SS transmission/reception unit 61.

Particularly, the second SS-CPU 84 has a function of radio wave state detection means for detecting a communication state (such as strength of an radio wave or hindrance to a communication route) between the wireless center unit 102 and the TV main body unit 103, according to an electric field strength of a received radio wave and a request for re-transmission based on an error ratio. Information indicating a state of the detected radio wave is transmitted to the TV microcomputer 64 as a TV command 71.

In the present embodiment, an arrangement is described in which the second SS-CPU 84 in the SS transmission/reception unit 61 of the TV main body unit 103 has the function of detecting the state of the radio wave. However, it may be that the first SS-CPU 54 in the SS transmission/reception unit 36 of the wireless center unit 102 has the same function and information indicating a state of a detected radio wave is transmitted as a command from the wireless center unit 102 to the TV main body unit 103. Alternatively, it may be that both the first SS-CPU 54 and the second SS-CPU 84 have the function of detecting the state of the radio wave. Further, it may be that the TV microcomputer 64 or the wireless center microcomputer 37 has the function of detecting the state of the radio wave.

The TV microcomputer 64 controls the whole of the device, and has a function of informing means for informing, based on a detected communication state, a variety of messages such as discontinuation of image/audio data, changing of a communication channel, connecting of a communication channel, and reception quality information including being outside of communication range.

Further, the TV microcomputer 64 performs communication channel changing control in which how long a communication is discontinued is measured, and the communication channel is maintained until a predetermined time passes from a time when the communication is discontinued.

Further, the TV microcomputer 64 includes an OSD generating function section, and displays information such as a program channel, time, or volume, on a screen such as a TV. It is general that an image device such as a TV and an electronic apparatus such as a TV conference system display information such as a program channel, time, or volume on a TV screen. OSD data is maintained not in the form of an image but in a form referred to as a bit map. The OSD data in the bit map form is converted into pixel values in YUV form, which represents colors by Y, Cb, and Cr, and the converted pixels are superposed on an original image of a TV broadcast or the like. The superposing is performed in the OSD synthesizing section 69.

Further, by connecting an image reproducing device (not shown) such a DVD to the video 4 input terminal 21, which doubles as a TV output, it is possible to superpose an OSD display on a reproduced image on a display screen.

Further, the TV main body 3 may be arranged so as to include a speaker, a key input section, a slot and the like (these are not shown). The slot is for inserting a card-type external extension storage medium, and directly reading data by attaching a card type external extension storage medium to the slot. Examples of the card type external extension storage medium are: an SRAM (Static RAM) card which maintains written information by power source back up; a Compact Flash (CF)™ made of a flash memory and the like which does not need power source back up; a smart media; a memory stick; and a micro hard disc drive (HDD), whose size is substantially the same as a Compact Flash, or which may be attached to a PC card Type II.

Further, the remote control light receiving section 66 included in the TV main body 3 is a light communication port section using IR (Infrared Rays), and receives a light signal from a remote control device for controlling a variety of operations in the TV main body unit 103 or the wireless center unit 102. To be specific, the remote control light receiving section 66 is an I/O port for performing light communication based on IrDA (Infrared Data Association), ASK and the like, which are standards used for transmission of data by infrared rays, or a wireless communication port performing communication by an radio wave.

Further, the battery 67 supplies a predetermined power to each section of the TV main body unit 103. When it is possible to charge the battery 67, the battery charger microcomputer 68 detects that, for example, the TV main body unit 103 is attached to the wireless center unit 102 or other cradle, and controls charging/discharging of a charge medium (not shown) of the battery 67 via a power supply terminal (not shown). To be specific, the battery charger microcomputer 68 stores and counts a discharged current from a battery pack, and begins charging when it judges that a remaining amount of charge in the battery pack is less than a predetermined value. In charging, the battery charger microcomputer 68 stores and counts a current charged to the battery pack, and stops charging when it judges that the battery pack is fully charged. When the TV main body 3 is separated from a commercial power source, the charged battery 67 serves as a main power source for a portable TV, and supplies power to each section of the TV main body 3.

Next, a method is explained for transmitting/receiving control data between the wireless center 2 and the TV main body 3 in the wireless AV system 101 having the above arrangement of the present embodiment.

Here, according to an input by a user, or to an action by a predetermined program, the wireless center microcomputer 37 of the wireless center unit 102 transmits control data including a discrimination code and a control command to the SS transmission/reception unit 36, the SS transmission/reception unit 61 of the TV main body unit 103, or the TV microcomputer 64 of the TV main body 3.

Here, the discrimination code is a code for discriminating which of a plurality of controlled devices the control command is for, and is generally added to a header part of control data.

The TV command 44 transmitted by the wireless center microcomputer 37 of the wireless center 2 is received by the first SS-CPU 54 of the SS transmission/reception unit 36. When the TV command 44 is control data including a control command for the SS transmission/reception unit 36, the first SS-CPU 54 performs a corresponding process.

When the TV command 44 transmitted by the wireless center microcomputer 37 is control data for the SS transmission/reception unit 61 or TV microcomputer 64 of the TV main body unit 103, the first SS-CPU 54 of the SS transmission/reception unit 36 performs a predetermined coding of the data, and then transmits by wireless the coded data via the SS wireless transmission/reception engine 53.

The SS transmission/reception unit 61 of the TV main body unit 103 receives the wireless data and discriminates control data by the second SS-CPU 84, and when the control data is for the SS transmission/reception unit 61, the second SS-CPU 84 performs a predetermined process.

When the received data is control data for the TV microcomputer 64, the second SS-CPU 84 transmits the control data as the TV command 71 to the TV microcomputer 64. As a result, the TV microcomputer 64 performs a predetermined process in the TV main body 3.

Figure 4A:
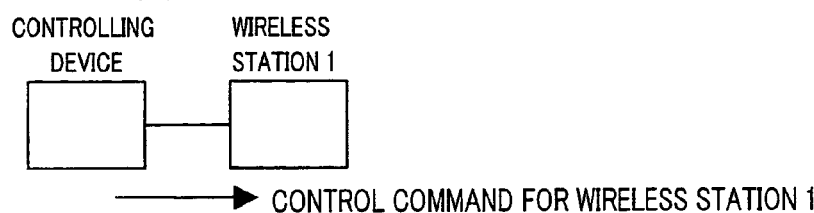
FIG. 4($a$) is a schematic diagram illustrating one example of transmission/reception of a control command between the wireless center unit and the TV main body unit.
Figure 4B:
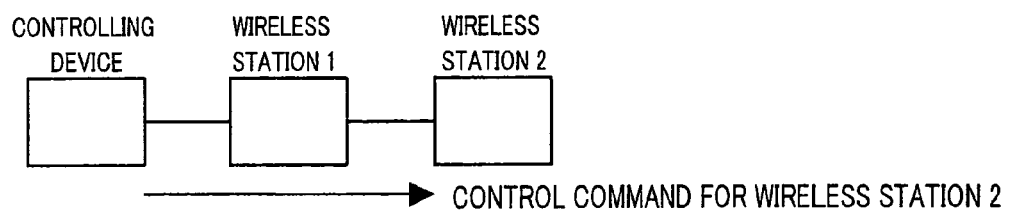
Figure 4C:
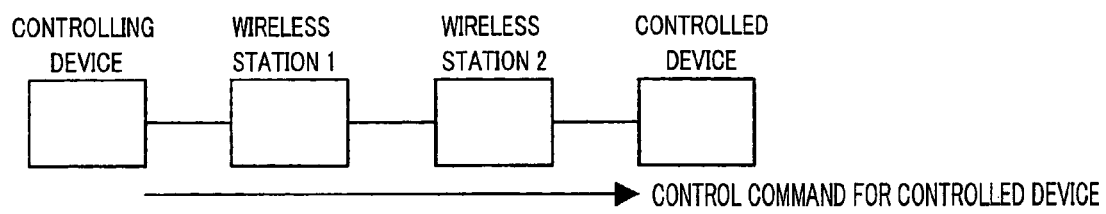

FIGS. 4(a) through 4(c) schematically illustrate transmission/reception of control data (referred to as a control command hereinafter) between the wireless center unit 102 and the TV main body unit 103.

Note that in FIGS. 4(a) through 4(c), a controlling device means the wireless center microcomputer 37 of the wireless center unit 102, a wireless station 1 means the SS transmission/reception unit 36 of the wireless center unit 102, a wireless station 2 means the SS transmission/reception unit 61 of the TV main body unit 103, and a controlled device means the TV microcomputer 64 of the TV main body unit 103.

FIG. 4(a) illustrates a case where the controlling device transmits control data having a control command directed to the wireless station 1 (own station) in the controlling device itself. This case is referred to as a first control data transmission/reception mode. In the first control data transmission/reception mode, it is conceivable that, for example, the wireless center microcomputer 37 transmits control data having a control command for changing an MPEG transmission rate or switching a wireless channel, to the SS transmission/reception unit 36, according to a wireless communication circumstance.

FIG. 4(b) illustrates a case where the controlling device transmits control data including a control command to the wireless station 2 (other station), which is different to the controlling device. This case is referred to as a second control data transmission/reception mode. In the second control data transmission/reception mode, it is conceivable that, for example, the wireless center microcomputer 37 transmits control data including a control command for changing the MPEG transmission rate or switching the wireless channel, to the SS transmission/reception unit 61 of the TV main body unit 103, according to a wireless communication circumstance.

FIG. 4(c) illustrates a case where the controlling device transmits control data including a control command to a controlled device, which is different to the controlling device. This case is referred to as a third control data transmission/reception mode. In the third control data transmission/reception mode, it is conceivable that, for example, the wireless center microcomputer 37 transmits control data including a control command for changing an inputted channel of a program or changing a variety of settings.

Further, opposite to the cases illustrated in FIGS. 4(a) through 4(c), in an example where the TV microcomputer 64 of the TV main body unit 103 is a controlling device and the wireless center microcomputer 37 of the wireless center unit 102 is a controlled device, it is conceivable that a control command for changing a tuner channel or audio setting is transmitted. This example is fully explained later.

Next, a data structure of control data transmitted/received in the present embodiment is explained. The wireless AV system 101 of the present embodiment makes it easy to discriminate control data, by transmitting/receiving the control data with a predetermined key code in a header part (control command) of the control data.

Figures 5, 6:
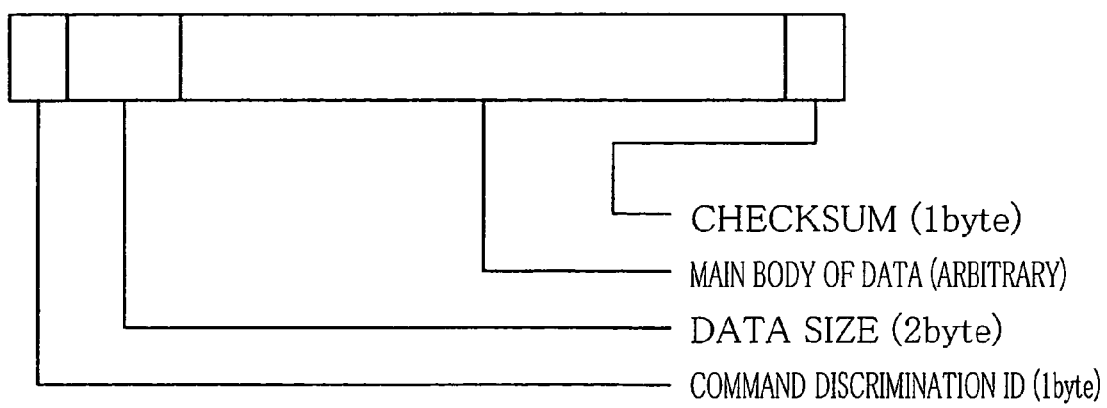
FIG. 5 is a figure illustrating one example of a key code included in control data in the wireless AV system illustrated in FIG. 1.
FIG. 6 is a figure illustrating one example of a data format of a control command transmitted/received in the wireless AV system illustrated in FIG. 1.

FIG. 5 illustrates an example of a key code included in control data. In the example illustrated in FIG. 5, a key code for discriminating control data is "0xFF". The key code is preset, and can be set arbitrarily. Further, when a code identical with the preset key code "0xFF" is included in a main body of the data, this code is converted according to a predetermined rule. Specifically, "0xFE" in the main body of the data is converted into "0xFE 0x00", and "0xFF" is converted into "0xFE 0x01".

With such a conversion, control data transmitted/received in the present system is easily discriminated with use of the key code "0xFF" included in the header.

Further, by converting "0xFE 0x00" into "0xFE" and "0xFE 0x01" into "0xFF" at a receiving-side of the control data, it is possible to easily restore the original control data.

FIG. 6 illustrates an example of a format of control data transmitted/received in the wireless AV system 101 of the present embodiment. As illustrated in FIG. 6, control data is constituted of a command discrimination ID (a control command including a key code), a data size, a main body of data (control command), and a checksum.

The command discrimination ID is predetermined as an ID for discriminating the destination to which the command is transmitted. In the present embodiment, a command for the wireless station (own station) is discriminated by ID=1, a command for the wireless station (other station) is discriminated by ID=2, and a command for a controlled device sent via the other station is discriminated by ID=3. Further, a command for an external device connected to the controlled device is discriminated by ID=4.

The checksum is a value (low 1 byte) calculated by adding values of a command discrimination ID, a data size, and a main body of data, using 1 byte as a unit.

FIGS. 7(a) through 7(d) illustrate examples of code conversions of control commands.

FIG. 7(a) illustrates an example of a conversion of the control command for the wireless station (own station) (control command for the wireless station 1). The command discrimination ID in this case is set to 1.

FIG. 7(b) illustrates an example of a conversion of the control command for the wireless station (other station) (control command for the wireless station 2). The command discrimination ID in this case is set to 2.

FIG. 7(c) illustrates an example of a conversion of the control command for the controlled device sent via the other station. The command discrimination ID in this case is set to 3.

FIG. 7(d) illustrates an example of a conversion of the control command for the external device connected to the controlled device. The command discrimination ID in this case is set to 4.

In the case of any command, the data after conversion includes a key code "0xFF" in the head of the data, and "0xFE" and "0xFF" in the data before conversion are converted into "0xFE 0x00" and "0xFE 0x01" respectively, so that the key code is not misidentified.

Here, concrete examples of a variety of control commands are described below.

Examples of n own station commands (command discrimination ID=1) are,

Reception quality acquisition command: 0x01 0x00 0x01 0x01 0x03

Channel number acquisition command: 0x01 0x00 0x01 0x02 0x04

Examples of other-station commands (command discrimination ID=2) are,

Channel changing command: 0x02 0x0 00x01 0x01 0x04

Name of other-station device acquisition command: 0x02 0x00 0x01 0x02 0x05

Examples of commands for a device connected to the other-station (command discrimination ID=3) are, Reproduction command: 0x03 0x00 0x02 0x00 0x01 0x06

Stop command: 0x03 0x00 0x02 0x00 0x02 0x07

Fast forward command: 0x03 0x00 0x02 0x00 0x03 0x08

Rewinding command: 0x03 0x00 0x02 0x00 0x04

In the examples illustrated in FIGS. 4(a) through 4(c), the controlling device is the wireless center microcomputer 37 of the wireless center unit 102, and the controlled device is the TV microcomputer 64 of the TV main body unit 103. On the other hand, it may be that the controlling device is the TV main body unit 103 and the controlled device is the wireless center unit 102. An example of this case is explained below, with respect to each purpose of each control command, with reference to FIGS. 8(a) and 8(b) through FIGS. 11(a) and (b).

Here, it is assumed that the controlling device is the TV microcomputer 64 of the TV main body unit 103, and that the wireless station 1 is the SS transmission/reception unit 61 of the TV main body unit 103. Further, it is assumed that the wireless station 2 is the SS transmission/reception unit 36 of the wireless center unit 102, and that the controlled device is the wireless center microcomputer 37 of the wireless center unit 102. It is assumed that the external device is an AV device (not shown) connected to the wireless center unit 102, such as a DVD recorder.

Figure 8A:
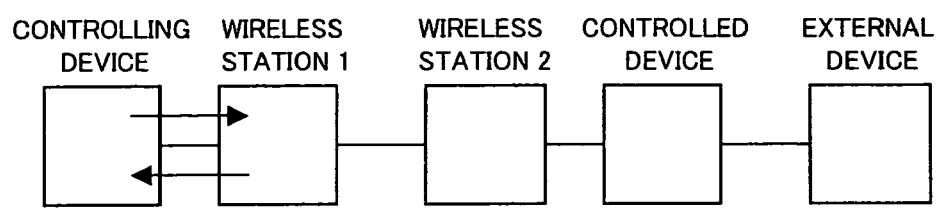
FIG. 8($a$) is a schematic diagram illustrating transmission/reception of control data in a case where acquisition of transmitted radio wave strength at a wireless station is intended.

When acquisition of transmitted radio wave strength in the wireless station 1 is intended, the controlling device transmits control data to the wireless station 1, as illustrated in FIG. 8(a). In this case, the command discrimination ID=1, and the control data has a data structure illustrated in FIG. 8(b). Here, as illustrated in FIG. 7(a), the control command included in the control data is converted by the TV microcomputer 64, acting as the controlling device, of the TV main body unit 103.

Figure 8B:
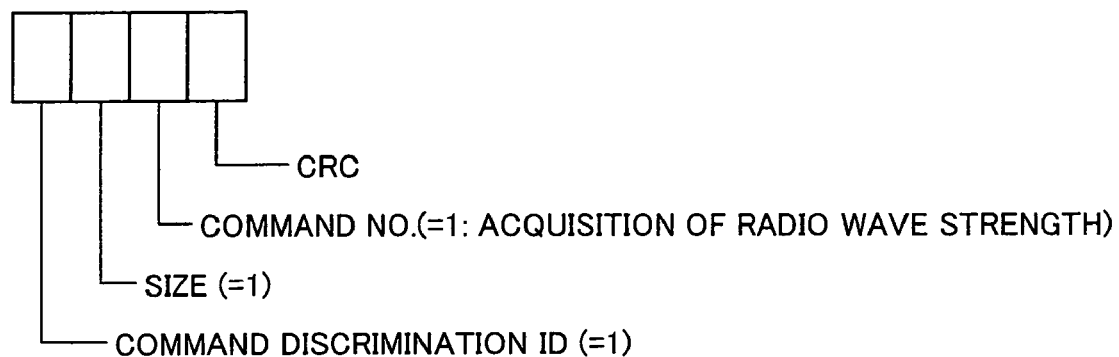

Note that the control data illustrated in FIG. 8(b) includes a 1 byte control command (a control command after conversion, illustrated in FIG. 7(a)) corresponding to the command discrimination ID=1, 2 bytes of size data for indicating a size of a main body of the control data, 1 byte of data showing a main body of the data (a command number indicating acquisition of transmitted radio wave strength), and 1 byte of data (CRC) indicating a checksum.

When acquisition of received radio wave strength in the wireless station 1 is intended, the controlling device transmits a control command to the wireless station 2 via the wireless station 1. In this case, the command discrimination ID=2, and the control data has a data structure illustrated in FIG. 9(b). Here, as illustrated in FIG. 7(b), the control command included in the control data is converted by the TV microcomputer 64, acting as the controlling device, of the TV main body unit 103.

Figure 9A:
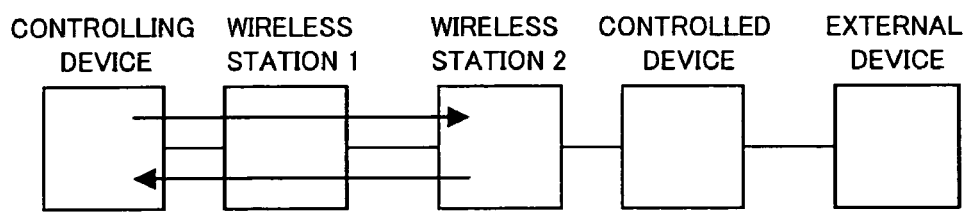
FIG. 9(a) is a schematic diagram illustrating transmission/reception of control data in a case where acquisition of received radio wave strength at a wireless station is intended.
Figure 9B:
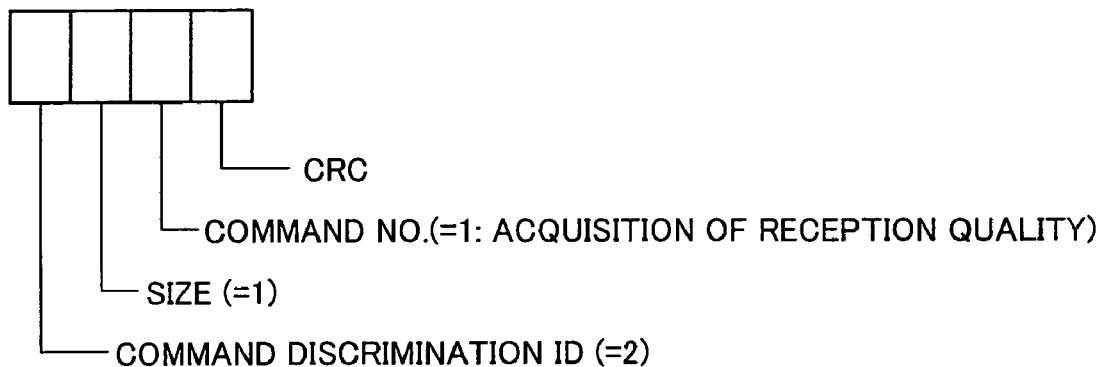
FIG. 9(b) is a figure illustrating a data structure of control data in the transmission/reception of control data illustrated in FIG. 9(a).

Note that the control data illustrated in FIG. 9(b) includes a 1 byte control command (a control command after conversion, illustrated in FIG. 7(b)) corresponding to the command discrimination ID, 2 bytes of size data for indicating a size of the control data, 1 byte of data indicating a main body of the data (a command number indicating acquisition of a received radio wave strength), and 1 byte of data (CRC) indicating a checksum.

Figure 10A:
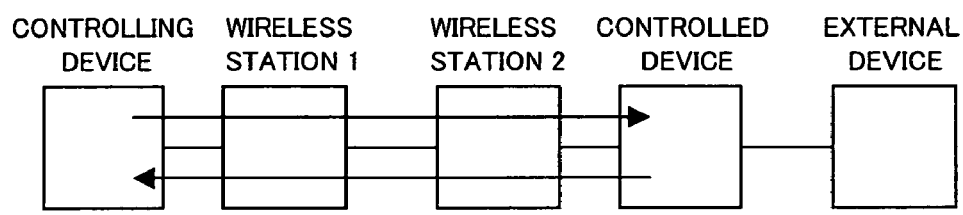
FIG. 10(a) is a schematic diagram illustrating transmission/reception of control data in a case where switching of an external input in a controlled device is intended.
Figure 10B:
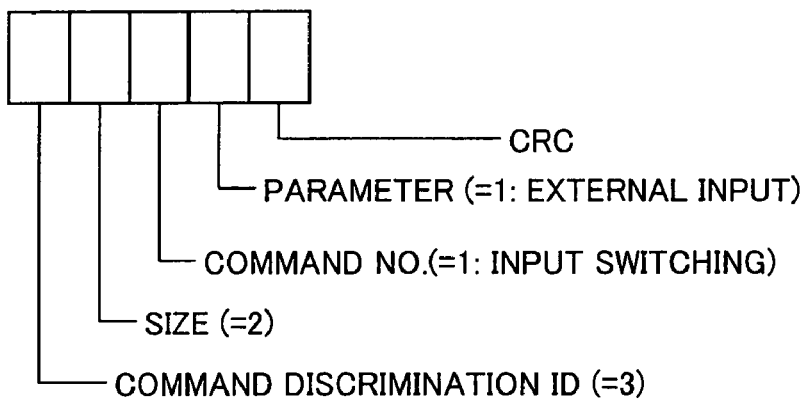
FIG. 10(b) is a figure illustrating a data structure of control data in the transmission/reception of control data illustrated in FIG. 10(a).

When switching of an external input in the controlled device is intended, the controlling device transmits a control command to the controlled device via the wireless stations 1 and 2, as illustrated in FIG. 10(*a*). In this case, the command discrimination ID=3, and the control data has a data structure illustrated in FIG. 10(*b*). Here, as illustrated in FIG. 7(*c*), the control command included in the control data is converted by the TV microcomputer 64, acting as the controlling device, of the TV main body unit 103.

Note that the control data illustrated in FIG. 10(*b*) includes 1 byte of data corresponding to the command discrimination ID, 2 bytes of size data indicating a size of the control data, 1 byte of data indicating a main body of the data (a command number corresponding to input switching), data corresponding to a parameter indicating an external input 1, 1 byte of data (CRC) indicating a checksum.

When direct remote control of an external device via the controlled device is intended, the controlling device transmits a control command to the external device via the wireless stations 1 and 2 and the controlled device. In this case, the command discrimination ID=4, and the control data has a data structure illustrated in FIG. 11(*b*). Here, as illustrated in FIG. 7(*d*), the control command included in the control data is converted by the TV microcomputer 64, acting as the controlling device, of the TV main body unit 103.

Figure 11:
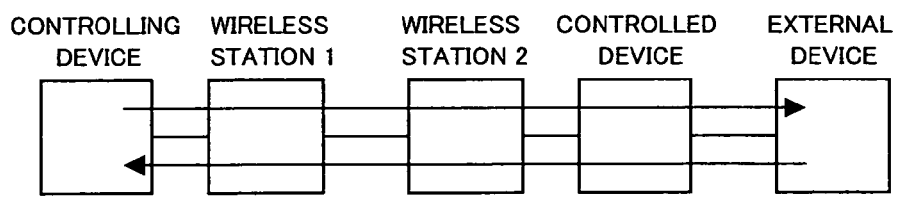
FIG. 11(a) is a schematic diagram illustrating transmission/reception of control data in a case where direct remote control of an external device via a controlled device is intended.
FIG. 11(b) is a figure illustrating a data structure of control data in the transmission/reception of control data illustrated in FIG. 11(a).
Figure 11:
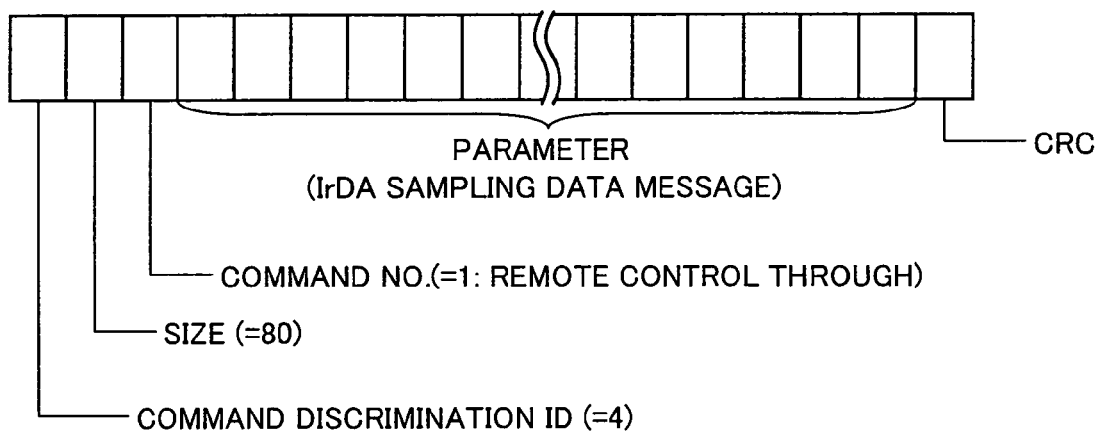

Note that the control data illustrated in FIG. 11(*b*) includes 1 byte of data corresponding to the command discrimination ID, 2 bytes of data indicating a size of the control data (here, a main body of the data is 80 bytes), data indicating a main body of the data (a command number corresponding to a remote-control-issued function), data corresponding to a parameter indicating an IrDA sampling data message, and 1 byte of data (CRC) indicating a checksum.

As a concrete example of control command transmission, as illustrated in FIGS. 11(*a*) and 11(*b*), for example, the wireless AV system 101 illustrated in FIG. 12 is considered. Here, in the wireless AV system 101 illustrated in FIG. 12, it is possible to operate, using the remote controller 130, an external device such as a DVD player or a video deck connected to the wireless center unit 102, via the TV main body unit 103.

As an application of such a remote control operation, a system illustrated in FIG. 13 is conceivable. In FIG. 13, three TV main body units 103*a* through 103*c* transmit control data to one wireless center unit 102, and perform remote control of external devices (devices A through C) connected to the wireless center unit 102. Namely, the wireless center unit 102 transmits control data received from the TV main body unit 103 to remote control light receiving sections (110*a* through 110*c*) of the remotely controlled devices.

In this case, the control data is generated on the TV main body unit 103 side, transmitted from the TV main body unit 103 to the wireless center unit 102, and transmitted from the wireless center unit 102 to each of the external devices. A process for distributing the control data to the external devices is performed in the wireless center microcomputer 37 of the wireless center unit 102.

The wireless AV system 101 to which the wireless control system of the present invention is applied is explained above, with reference to concrete embodiments. However, the present invention is not limited to the embodiments. It is possible for a person with ordinary skill in the art to which the invention pertains, to perform a variety of changes or modifications to arrangements and functions of the invention according to each of the embodiments or other embodiments, within the scope of the present invention.

For example, in the present embodiment, as a wireless AV device, a portable TV is exemplified. However, the present invention is not limited to a TV receiver, and is applicable to a device having a wireless communication function or to a device into which a wireless communication function is merged. For example, the AV device may be a VTR (Video Tape Recorder), or record reproducing device which stores a record in a HDD or DVD. Further, a device for transmission/reception of data may be a device in which a function for transmission/reception of data is merged with an information device function represented by a personal computer, and applicable to all the systems. Further, contents of transmitted/received data may be anything.

Further, in the present embodiment, the TV receiver is exemplified, but the present invention is not limited to this, and is applicable to a personal computer with a tuner, or to other AV devices using a tuner.

Further, kinds of each section constituting the wireless communication device and the wireless AV system, and kinds/styles of setting information or the like are not limited to the embodiments. Particularly, the present invention may be preferably applied to a device based on HAVi.

Further, as a tuner, two broadcasting tuners such as a BS tuner and a U/V tuner are exemplified, but kinds and numbers of broadcasting tuners are not limited to this. For example, a CS tuner may be used.

Further, in the present embodiment, names such as a wireless communication device and a wireless AV system are used, but these names are used for convenience of explanation, and they may be a wireless communication apparatus, an AV device, a broadcasting selecting device, or the like.

The wireless communication device and the wireless AV system as described above can be realized by a program for causing the wireless communication device and the wireless AV system to function. The program may be stored in a storage medium readable by a computer. In the present invention, the storage medium may be program media being a main memory itself, or program media readable by inserting a storage medium into a program reading device provided as an external storage device.

In either case, the stored program may be arranged so as to be carried out by access by a CPU. Alternatively, in either case, the program may be arranged so as to be read out, downloaded to a program storage area (not shown) and carried out. A program for downloading is stored in a main body of the device beforehand.

Here, the program media may be arranged so as to be a storage medium detachable from the main body, and be a medium permanently storing a program. For example, tapes such as a magnetic tape and a cassette tape, discs such as a magnetic disc (e.g. Floppy™ disc or a hard disc) or an optical disc (e.g. CD-ROM, MO, MD, or DVD), cards such as an IC card or an optical card, and semiconductor memories such as a mask ROM, EPROM, EEPROM, or flash ROM.

Further, when means (not shown) for connecting with an external communication network is provided, the program media may be arranged so as to be a medium for temporarily storing a program so as to download the program from a communication network via means for connecting with an external communication network.

Note that when a program is downloaded from the communication network in this way, a program for downloading may be stored in the main body of the device beforehand, or may be installed from other storage media. Contents to be stored in the storage media are not limited to programs, and may be data.

Further, at present, new terrestrial digital broadcasting has been prepared, which will take the place of analog terrestrial broadcasting viewed across the country. The terrestrial digital broadcasting started in 2003 in three urban areas: Kanto, Kinki, and Tokai, and will spread across the country in 2006. Along with this spreading, current analog broadcasting will be abolished in 2011.

ISDB (Integrated Services Digital Broadcasting) is a concept of the next generation of integrated digital broadcasting that treats all information such as images, audio, and data items, as digital data items. As a concrete service of ISDB, digital TV broadcasting, digital audio broadcasting, facsimile broadcasting, multimedia broadcasting and the like are studied. As a transmission channel for ISDB, a satellite broadcast wave, a terrestrial broadcast wave, and a wired transmission channel such as a co-axial cable or an optical fiber are now considered.

Technical standard ISDB-T (Terrestrial) of the terrestrial digital broadcasting adopts OFDM (Orthogonal Frequency Division Multiplexing) that uses a number of carriers as a modulation method, and thereby allows reduction of ghosting caused by a plurality of transmission routes (multiple-paths) such as reflection from buildings. Further, ISDB-T defines a plurality of transmission modes, which define a carrier interval, a plurality of modulation methods with respect to each carrier, and a plurality of guard intervals in temporal axis directions provided with respect to each effective symbol length, and accordingly a large number of signal methods are allowed as standard. In practice, out of these methods, an optimal method is selected according to a service, such as fixed reception or mobile reception.

Further, in ISDB-T, one transmission channel (band is approximately 5.6 MHz) is divided into 13 segments (1 segment=approximately 430 kHz), and the modulation method is changed using this segment as a unit. As a result, a broadcasting station can determine a signal arrangement arbitrarily, such as audio broadcasting and high definition broadcasting in one channel, and standard fixed broadcasting and mobile broadcasting in another channel.

Further, ISDB-T adopts an interleave in a temporal direction, and a radio wave used for ISDB-T is suitable for transmission to a movable body. As such, ISDB-T allows stabilized reception even by a receiving device on a movable body, such as an in-vehicle TV, and a portable terminal such as a PDA (Personal Digital Assistant) or a mobile phone. In future, a service assuming such mobile reception is greatly expected.

Therefore, the wireless control system of the present invention can be preferably used for such services.

Further, the present invention may be arranged as follows.

The device according to the present invention may be arranged to be a device for transmitting/receiving control data among AV devices constituting the wireless AV system, including: means for generating control data; means for converting the generated control data; means for transmitting/receiving by wireless the converted control data; and means for discriminating the converted control data and acquiring the data before conversion.

Further, the means for converting the control data may be arranged so that the means adds a key code for discriminating the control data to a head part of the control data, and when data whose content is identical with the key code exists in another part of the control data, the means performs a predetermined conversion of the data.

Further, the control data may include: data by which the AV device constituting the wireless AV system controls a wireless communication station in the AV device itself; data by which the AV device controls a wireless communication station in an AV device other than the AV device itself; and data by which the AV device controls the AV device other than the AV device itself.

Further, the control data may include a command for changing a data transmission rate, changing a wireless communication channel, changing a tuner channel, and switching an input.

As described above, with the wireless AV system of the present invention, when transmission/reception of control data among the AV devices is performed, it is possible to discriminate control data according to a key code added to a header, without processing a main body of the data. As a result, it is possible to reduce the burden of data discrimination in a wireless station and a terminal.

The present invention is not limited to the embodiments, and a variety of modifications are possible within the scope of the following claims. That is, embodiments obtained by combining technical means suitably modified within the scope of the following claims are also within the technical scope of the present invention.

Each section of the wireless AV system 101 of the embodiments can be realized in such a manner that calculation means such as a CPU performs a program stored in storage means such as a ROM (Read Only Memory) or RAM, and controls input means such as a keyboard, output means such as a display, or communication means such as an interface circuit. Therefore, a computer having such means reads a storage medium for storing the program and carries out the program, and thereby a variety of functions and a variety of processes of the wireless AV system 101 of the present embodiment can be realized. Further, by storing the program in a removable storage medium, it is possible to realize a variety of the functions and a variety of the processes in an arbitrary computer.

The storage medium may be program media being a memory (not shown), such as a ROM, so as to be processed by a microcomputer, or program media readable by inserting a storage medium to a program reading device (not shown) provided as an external storage device.

In either case, it is preferable that the stored program is carried out by an access by a microprocessor. Further, it is preferable that the program is read out, downloaded to a program storage area of the microcomputer and carried out. A program for downloading is stored in the main body of the device beforehand.

Further, the program medium is a storage medium detachable from the main body, and permanently storing a program. For example, tapes such as a magnetic tape and a cassette tape, discs such as a magnetic disc (e.g. a flexible disc or a hard disc) or an optical disc (e.g. CD, MO, MD, or DVD), cards such as an IC card (including a memory card), and semiconductor memories such as a masked ROM, EPROM (Erasable Programmable Read Only Memory), EEPROM (Electrically Erasable Programmable Read Only Memory), or flash ROM.

Further, when it is possible to connect the system with a communication network including the Internet, it is preferable that the program media is a medium for temporarily storing a program so as to download the program from the communication network.

Further, when a program is downloaded from the communication network in this way, it is preferable that a program for downloading is stored in the main body of the device beforehand, or installed from other storage media.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The wireless system of the present invention is preferably used for a home AV network system (e.g. a wireless TV receiver having a separable display) that transmits image and/or audio data by wireless. However, the wireless system of the present invention is not limited to this, and is widely applicable for a wireless communication device such as a mobile phone/PHS (Personal Handy-Phone System)™ or a portable information terminal (PDA (Personal Digital Assistant)).

The invention claimed is:

1. A wireless control system comprising a controlling device and controlled devices that are wirelessly controlled by the controlling device,
   wherein the controlling device wirelessly generates and transmits control data to the controlled devices, the control data including (i) a control command and (ii) a discrimination code for discriminating which of the controlled devices in the system the control command is for, and
   the controlled devices receive the wirelessly transmitted control data from the controlling device, read out the discrimination code included in the control data, and discriminating which of the a controlled device in the system the control command is for, the control data being transmitted to a controlled device discriminated by the discrimination section,
   wherein the control command includes one of a first command, a second command, and a third command,
      the first command includes a reception quality acquisition command and a channel number acquisition command,
      the second command includes a channel changing command and a name of other-station device acquisition command, and
      the third command includes a reproduction command, a stop command, a fast forward command, and a rewinding command, wherein
      the first command is control data transmitted to a first controlled device by the controlling device;
      the second command is control data transmitted to a second controlled device by the controlling device via the first controlled device; and
      the third command is control data transmitted to a third controlled device by the controlling device via the first controlled device and via the second controlled device.

2. A wireless control system comprising a controlling device and controlled devices that are wirelessly controlled by the controlling device,
   wherein the controlling device includes:
   a control data generating section for generating control data including (i) a control command and (ii) a discrimination code for discriminating which of the controlled devices in the system the control command is for; and
   a wireless communication section for transmitting the control data transmitted from the control data generating section, to a controlled device with which the wireless communication section is in communication, and
   wherein each of the controlled devices includes:
   a wireless communication section for receiving the control data from the controlling device;
   a discrimination section for reading out the discrimination code included in the received control data, and discriminating which of the controlled devices the control command included in the control data is for; and
   a control data transmission section for transmitting the control data to a controlled device discriminated by the discrimination section,
   wherein, when generated control data includes same data as a predetermined key code, the control data generating section performs a predetermined conversion of the same data, and transmits the converted control data to the wireless communication section.

3. The wireless control system as set forth in claim 2, wherein control data generated in the control data generating section is any one of control data to be transmitted to a control section included in the controlling device, control data to be transmitted to the wireless communication section in the controlling device, control data to be transmitted to a control section included in the controlled devices, and control data to be transmitted to the wireless communication section in the controlled devices.

4. The wireless control system as set forth in claim 2, wherein the wireless communication section transmits control data using a spread spectrum wireless system.

5. The wireless control system as set forth in claim 2, wherein the wireless communication section performs low power, close range, two-way wireless communication such as a wireless LAN, Bluetooth or UWB (Ultra Wide Band).

6. The wireless control system according to claim 2, wherein, when the predetermined key code for discriminating the control data is provided in header of the control data, and data body of the control data includes same data as the predetermined key code, the controlling devices performs a predetermined conversion of the same data, and transmits the converted control data to the controlled devices.

7. A wireless control system comprising a controlling device and controlled devices that are wirelessly controlled by the controlling device,
   wherein the controlling device includes:
   a control data generating section for generating control data including (i) a control command and (ii) a discrimination code for discriminating which of the controlled devices in the system the control command is for; and
   a wireless communication section for transmitting the control data transmitted from the control data generating section, to a controlled device with which the wireless communication section is in communication, and
   wherein each of the controlled devices includes:
   a wireless communication section for receiving the control data from the controlling device;
   a discrimination section for reading out the discrimination code included in the received control data, and discriminating which of the controlled devices the control command included in the control data is for; and
   a control data transmission section for transmitting the control data to a controlled device discriminated by the discrimination section,
   wherein the control data includes, as a control command, a command for performing a change of a data transmission rate, a change of a wireless communication channel, a change of a tuner channel, switching of an input, and acquisition of a communication state, and
   wherein, when generated control data includes same data as a predetermined key code, the control data generating section performs a predetermined conversion of the same data, and transmits the converted control data to the wireless communication section.

8. Controlled devices, included in a wireless control system comprising a controlling device and controlled devices that are wirelessly controlled by the controlling device, said controlled devices (i) receiving control data which includes a discrimination code for discriminating between the controlled devices in the system, and (ii) discriminating a controlled device to carry out a control command included in the control data, based on the discrimination code included in the received control data, wherein the control command includes one of a first command, a second command, and a third command, the first command includes a reception quality acquisition command and a channel number acquisition command, the second command includes a channel changing command and a name of other-station device acquisition command, and the third command includes a reproduction command, a stop command, a fast forward command, and a rewinding command, wherein the first command is control data transmitted to a first controlled device by the controlling device;

the second command is control data transmitted to a second controlled device by the controlling device via the first controlled device; and the third command is control data transmitted to a third controlled device by the controlling device via the first controlled device and via the second controlled device.

9. The wireless control system according to claim 8, wherein, when a predetermined key code for discriminating the control data is provided in header of the control data, and data body of the control data includes same data as the predetermined key code, the controlling devices performs a predetermined conversion of the same data, and transmits the converted control data to the controlled devices.

10. Controlled devices, included in a wireless control system comprising a controlling device and controlled devices that are wirelessly controlled by the controlling device, said controlled devices including:

a wireless communication section for receiving from the controlling device control data including a discrimination code for discriminating between the controlled devices in the system;

a discrimination section for reading out the discrimination code included in the received control data and discriminating a controlled device to carry out a control command included in the control data; and a control data transmission section for transmitting the control data to the controlled device discriminated by the discrimination section, wherein the control data includes, as a control command, a command for performing a change of a data transmission rate, a change of a wireless communication channel, a change of a tuner channel, switching of an input, and acquisition of a communication state, and wherein, when the control data includes same data as a predetermined key code, the control data generating section performs a predetermined conversion of the same data, and transmits the converted control data to the wireless communication section.

11. A controlling device, included in a wireless control system comprising a controlling device and controlled devices that are wirelessly controlled by the controlling device, said controlling device wirelessly transmitting control data to the controlled devices, the control data having, in a control command for controlling the controlled devices, a discrimination code for discriminating between a controlled device to which the control command is to be transmitted and other one or more controlled devices in the system, wherein the control data includes, as a control command, a command for performing a change of a data transmission rate, a change of a wireless communication channel, a change of a tuner channel, switching of an input, and acquisition of a communication state, and wherein, when the control data includes same data as a predetermined key code, the control data generating section performs a predetermined conversion of the same data, and transmits the converted control data to the wireless communication section.

12. A controlling device, included in a wireless control system comprising a controlling device and controlled devices that are wirelessly controlled by the controlling device, said controlling device including:

a control data generating section for generating control data having, in a control command for controlling the controlled devices, a discrimination code for discriminating between a controlled device to which the control command is to be transmitted and other one or more controlled devices in the system; and a wireless communication section for transmitting the control data transmitted from the control data generating section, to a controlled device with which the wireless communication section is in communication, wherein, when generated control data includes same data as a predetermined key code, the control data generating section performs a predetermined conversion of the same data, and transmits the converted control data to the wireless communication section.

13. The wireless control system according to claim 12, wherein, when the predetermined key code for discriminating the control data is provided in header of the control data, and data body of the control data includes same data as the predetermined key code, the controlling devices performs a predetermined conversion of the same data, and transmits the converted control data to the controlled devices.

14. A method of controlling devices, in which a controlling device wirelessly controls controlled devices, wherein the controlling device wirelessly transmits control data to the controlled devices, the control data having, in a control command for controlling the controlled devices, a discrimination code for discriminating between a controlled device to which the control command is to be transmitted and other one or more controlled devices in the system, and the controlled devices receive the control data wirelessly transmitted from the controlling device, and, based on the discrimination code included in the received control data, discriminate a controlled device to carry out the control command included in the control data, and transmit the control data to the discriminated controlled device, wherein the control data includes, as a control command, a command for performing a change of a data transmission rate, a change of a wireless communication channel, a change of a tuner channel, switching of an input, and acquisition of a communication state, and wherein, when the control data includes same data as a predetermined key code, the control data generating section performs a predetermined conversion of the same data, and transmits the converted control data to the wireless communication section.

15. The method of controlling devices according to claim 14, wherein, when the predetermined key code for discriminating the control data is provided in header of the control data, and data body of the control data includes same data as the predetermined key code, the controlling devices performs a predetermined conversion of the same data, and transmits the converted control data to the controlled devices.

16. A machine-readable medium having instructions stored thereon, said instructions are read and executed by a processor for causing the processor to perform a method of discriminating between controlled devices, comprising:

receiving control data which includes a discrimination code for discriminating between controlled devices in a system, and (ii) discriminating a controlled device to carry out a control command included in the control data, based on the discrimination code included in the received control data, wherein the control command includes one of a first command, a second command, and a third command, the first command includes a reception quality acquisition command and a channel number acquisition command, the second command includes a channel changing command and a name of other-station device acquisition command, and the third command includes a reproduction command, a stop command, a fast forward command, and a rewinding command, wherein the first command is control data transmitted to a first controlled device by the controlling device;

the second command is control data transmitted to a second controlled device by the controlling device via the first controlled device; and the third command is control data transmitted to a third controlled device by the controlling device via the first controlled device and via the second controlled device.

17. A machine-readable medium having instructions stored thereon, said instructions are read and executed by a processor for causing the processor to perform a method of discriminating between controlled devices, comprising:

receiving control data including a discrimination code for discriminating between controlled devices in a system;

reading out the discrimination code included in the received control data and discriminating a controlled device to carry out a control command included in the control data; and transmitting the control data to the controlled device discriminated, wherein the control data includes, as a control command, a command for performing a change of a data transmission rate, a change of a wireless communication channel, a change of a tuner channel, switching of an input, and acquisition of a communication state, and wherein, when the control data includes same data as a predetermined key code, a predetermined conversion of the same data is preformed, and the converted control data is transmitted.

18. A machine-readable medium having instructions stored thereon, said instructions are read and executed by a processor for causing the processor to perform a method of discriminating between controlled devices, comprising:

transmitting control data to controlled devices, the control data having, in a control command for controlling a controlled devices, a discrimination code for discriminating between the controlled device to which the control command is to be transmitted and other one or more controlled devices in a system, wherein the control data includes, as a control command, a command for performing a change of a data transmission rate, a change of a wireless communication channel, a change of a tuner channel, switching of an input, and acquisition of a communication state, and wherein, when the control data includes same data as a predetermined key code, a predetermined conversion of the same data is preformed, and the converted control data is transmitted.

19. A machine-readable medium having instructions stored thereon, said instructions are read and executed by a processor for causing the processor to perform a method of discriminating between controlled devices, comprising:

generating control data having, in a control command for controlling controlled devices, a discrimination code for discriminating between a controlled device to which the control command is to be transmitted and other one or more controlled devices in a system; and transmitting the control data to a controlled device, wherein, when generated control data includes same data as a predetermined key code, performing a predetermined conversion of the same data and transmitting the converted control data.

* * * * *

UNITED STATES PATENT AND TRADEMARK OFFICE
CERTIFICATE OF CORRECTION

PATENT NO. : 7,702,323 B2  Page 1 of 1
APPLICATION NO. : 10/553345
DATED : April 20, 2010
INVENTOR(S) : Kenji Sakamoto It is certified that error appears in the above-identified patent and that said Letters Patent is hereby corrected as shown below:

Title page, item (54) and col. 1, title, should read:
A WIRELESS CONTROL SYSTEM, CONTROLLING DEVICE, CONTROLLED DEVICES, METHOD OF CONTROLLING DEVICES, CONTROL PROGRAnM, AND STORAGE MEDIUM READABLE BY COMPUTER FOR STORING THE PROGRAM Signed and Sealed this Thirty-first Day of August, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,702,323 B2 | Page 1 of 1 |
| APPLICATION NO. | : 10/553345 | |
| DATED | : April 20, 2010 | |
| INVENTOR(S) | : Kenji Sakamoto | |

It is certified that error appears in the above-identified patent and that said Letters Patent is hereby corrected as shown below:

Title page, item (54) and col. 1, title, should read:
A WIRELESS CONTROL SYSTEM, CONTROLLING DEVICE, CONTROLLED DEVICES, METHOD OF CONTROLLING DEVICES, CONTROL PROGRAM AND STORAGE MEDIUM READABLE BY COMPUTER FOR STORING THE PROGRAM This certificate supersedes the Certificate of Correction issued August 31, 2010.

Signed and Sealed this
Eighth Day of February, 2011

David J. Kappos
*Director of the United States Patent and Trademark Office*

US007702323C1

(12) EX PARTE REEXAMINATION CERTIFICATE (9402nd)

United States Patent
Sakamoto

(10) Number: US 7,702,323 C1
(45) Certificate Issued: Nov. 6, 2012

(54) WIRELESS CONTROL SYSTEM, CONTROLLING DEVICE, CONTROLLED DEVICES, METHOD OF CONTROLLING DEVICES, CONTROL PROGRAM AND STORAGE MEDIUM READABLE BY COMPUTER FOR STORING THE PROGRAM

(75) Inventor: Kenji Sakamoto, Chiba (JP)

(73) Assignee: Sharp Kabushiki Kaisha, Nagaike-Cho, Abeno-Ku, Osaka-Shi, Osaka (JP)

Reexamination Request:
No. 90/012,273, Apr. 26, 2012

Reexamination Certificate for:
Patent No.: 7,702,323
Issued: Apr. 20, 2010
Appl. No.: 10/553,345
Filed: Oct. 14, 2005

Certificate of Correction issued Aug. 31, 2010.
Certificate of Correction issued Feb. 8, 2011.

(21) Appl. No.: 90/012,273

(22) PCT Filed: Apr. 15, 2004

(86) PCT No.: PCT/JP2004/005435
§ 371 (c)(1),
(2), (4) Date: Oct. 14, 2005

(87) PCT Pub. No.: WO2004/093485
PCT Pub. Date: Oct. 28, 2004

(30) Foreign Application Priority Data

Apr. 17, 2003 (JP) ................................. 2003-112994
Apr. 12, 2004 (JP) ................................. 2004-117292

(51) Int. Cl.
*H04M 3/00* (2006.01)

(52) U.S. Cl. ........ 455/420; 455/410; 455/411; 455/419; 455/550.1; 455/556.1

(58) Field of Classification Search .................. None
See application file for complete search history.

(56) References Cited

To view the complete listing of prior art documents cited during the proceeding for Reexamination Control Number 90/012,273, please refer to the USPTO's public Patent Application Information Retrieval (PAIR) system under the Display References tab.

*Primary Examiner* — Eric B Kiss

(57) ABSTRACT

The wireless control system of the present invention constitutes a wireless AV system (101) which forms a wireless transmission network (1) in which a wireless center unit (102) and a TV main body unit (103) are connected with each other by a wireless LAN. The wireless center unit (102) transmits to the TV main body unit (103) control data having, in a control command, a discrimination code for discriminating between devices in the wireless AV system (101). The TV main body unit (103) reads out the discrimination code included in the received control data, discriminates a device to carry out the control command included in the control data, and transmits the control data to the discriminated device. As a result, even when the number of controlled devices that a controlling device has to control increases, a throughput of the controlling device for discrimination of control data does not increase, and therefore the whole system constituted of the controlling device and the controlled devices can be smoothly operated.

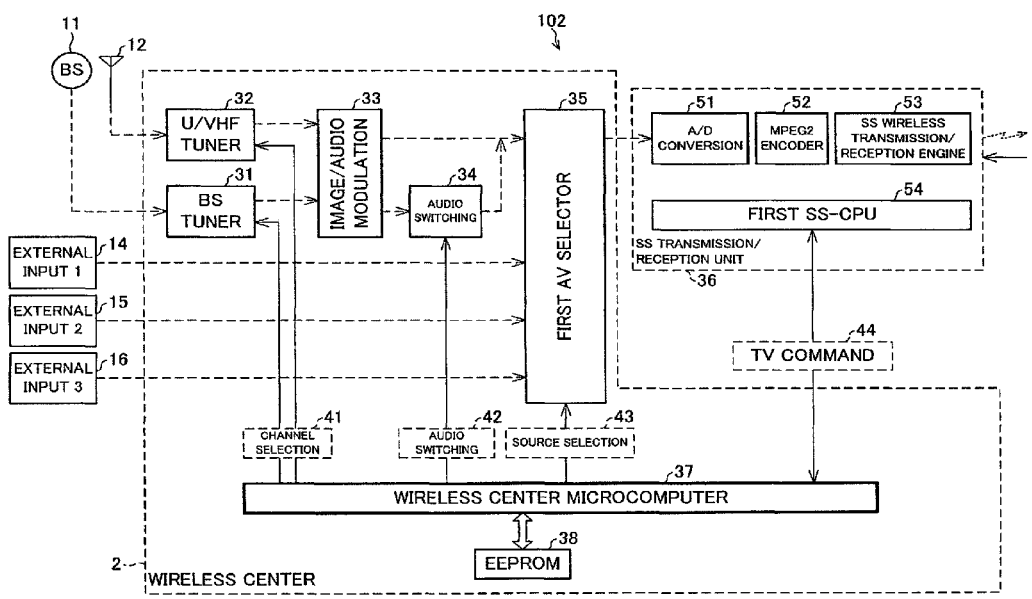

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

Claims 2-19 were not reexamined.

* * * * *